United States Patent
Villeval et al.

(10) Patent No.: US 11,112,497 B2
(45) Date of Patent: Sep. 7, 2021

(54) MAXIMUM DOPPLER EXTENSION VIA RECURSIVE CHIRP DECIMATION

(71) Applicant: GM GLOBAL TECHNOLOGY OPERATIONS LLC, Detroit, MI (US)

(72) Inventors: Shahar Villeval, Tel Aviv (IL); Oren Longman, Tel Aviv (IL); Igal Bilik, Rehovot (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 427 days.

(21) Appl. No.: 15/977,343

(22) Filed: May 11, 2018

(65) Prior Publication Data
US 2019/0346551 A1 Nov. 14, 2019

(51) Int. Cl.
*G01S 13/58* (2006.01)
*G01S 7/35* (2006.01)
*G01S 13/931* (2020.01)

(52) U.S. Cl.
CPC ............ *G01S 13/584* (2013.01); *G01S 7/352* (2013.01); *G01S 7/356* (2021.05); *G01S 13/931* (2013.01)

(58) Field of Classification Search
CPC .. G01S 13/584; G01S 7/352; G01S 2007/356; G01S 13/931; G01S 13/32
USPC .............. 342/111, 70, 92, 74, 133, 175
See application file for complete search history.

(56) References Cited

U.S. PATENT DOCUMENTS

| | | | | |
|---|---|---|---|---|
| 4,058,809 A | * | 11/1977 | Chudleigh, Jr. | G01S 13/5242 342/92 |
| 6,137,435 A | * | 10/2000 | Kai | G06K 9/3241 342/70 |
| 6,218,981 B1 | * | 4/2001 | Uehara | G01S 7/34 342/107 |
| 2004/0051660 A1 | * | 3/2004 | Kai | G01S 7/35 342/70 |
| 2015/0195670 A1 | * | 7/2015 | Agee | H04B 1/7156 375/133 |
| 2015/0331096 A1 | * | 11/2015 | Schoor | G01S 13/584 342/112 |
| 2016/0195614 A1 | * | 7/2016 | Tabrikian | G01S 13/931 342/74 |

\* cited by examiner

*Primary Examiner* — Bo Fan
(74) *Attorney, Agent, or Firm* — Cantor Colburn LLP

(57) ABSTRACT

A vehicle, system for navigating the vehicle and method of operating the vehicle. The system includes a radar system and a processor. The radar system transmits a linear frequency modulated signal into an environment of the vehicle and receives a reflection of the linear frequency modulated signal from an object in the environment. The processor partitions the reflection into a plurality of streams to obtain a Doppler frequency that exceeds a maximum Doppler frequency of the radar.

11 Claims, 5 Drawing Sheets

400

402

MAXIMUM DOPPLER EXTENSION VIA RECURSIVE CHIRP DECIMATION

INTRODUCTION

The subject disclosure relates to operation of radar systems and, in particular, to a method of extending a Doppler range of radar systems for high velocity objects.

Many vehicles include radar systems for determining parameters of an object in an environment of the vehicle, such as a range and velocity of the object with respect to the vehicle. Determining these parameters allows the driver, or an autonomous driving system of the vehicle, to take an action in order to avoid contact with the object. The radar systems generally operate by transmitting a sequence of linear frequency modulated signals, each signal being followed by a measurement phase during which a reflection of the signal is received at a receiver. A maximum velocity that can be determined by the radar system is limited by the duration of a pulse repetition interval, which is the combined duration of the linear frequency modulated signal and of the measurement phase. In low velocity scenarios, such as when the vehicle is in a parking lot, an urban environment, slow traffic, etc., the velocities of objects in the environment are within the velocity range defined by the maximum velocity. However, in high velocity scenarios, such as on highways, the velocities of some objects in the environment can exceed the maximum velocity. Accordingly, it is desirable to provide a method of extending the maximum velocity range in order to detect high velocity objects during high velocity scenarios.

SUMMARY

In one exemplary embodiment, a method of operating a vehicle is disclosed. The method includes receiving, at a radar, a reflection of a linear frequency modulated signal from an object in an environment of the vehicle, wherein the linear frequency modulated signal is transmitted from the radar into the environment. The reflection is partitioned into a plurality of streams to obtain a Doppler frequency that exceeds a maximum Doppler frequency of the radar.

In addition to one or more of the features described herein, the method includes partitioning the reflection into the plurality of streams in response to an external input. The method further includes, for each of the plurality of streams, obtaining a frequency space for the stream, determining a range of the object from at least one of the frequency spaces, combining the frequency spaces into a combined frequency space, and determining a Doppler frequency from the combined frequency space. The maximum Doppler frequency is defined by a pulse repetition frequency of the radar. The method further includes correcting a phase difference between the plurality of streams to combine the frequency spaces. The method further includes determining a parameter of the object from the range of the object and the Doppler frequency and navigating the vehicle with respect to the object based on the parameter. Determining the Doppler frequency from the combined frequency space further includes determining a frequency having a maximal intensity.

In another exemplary embodiment, a system for navigating a vehicle is disclosed. The system includes a radar system and a processor. The radar system transmits a linear frequency modulated signal into an environment of the vehicle and receives a reflection of the linear frequency modulated signal from an object in the environment. The processor partitions the reflection into a plurality of streams to obtain a Doppler frequency that exceeds a maximum Doppler frequency of the radar.

In addition to one or more of the features described herein, the processor is further configured to partition the reflection into the plurality of streams in response to an external input. The processor is further configured to obtain a frequency space for each of the plurality of streams, determine a range of the object from at least one of the frequency spaces, combine the frequency spaces into a combined frequency space, and determine a Doppler frequency from the combined frequency space. The maximum Doppler frequency is defined by a pulse repetition frequency of the radar. The processor is further configured to correct a phase difference between the plurality of streams when combining the frequency spaces. The processor is further configured to determine a parameter of the object from the range of the object and the Doppler frequency and navigate the vehicle with respect to the object based on the parameter. The processor is further configured to determine the Doppler frequency from the combined frequency space by determining a frequency having a maximal intensity.

In yet another exemplary embodiment, a vehicle is disclosed. The vehicle includes a radar system and a processor. The radar system transmits a linear frequency modulated signal into an environment of the vehicle and receives a reflection of the linear frequency modulated signal from an object in the environment. The processor is configured to partition the reflection into a plurality of streams to obtain a Doppler frequency that exceeds a maximum Doppler frequency of the radar.

In addition to one or more of the features described herein, the processor is further configured to partition the reflection into the plurality of streams in response to an external input. The processor is further configured to obtain a frequency space for each of the plurality of streams, determine a range of the object from at least one of the frequency spaces, combine the frequency spaces into a combined frequency space, and determine a Doppler frequency from the combined frequency space. The processor is further configured to correct a phase difference between the plurality of streams when combining the frequency spaces. The processor is further configured to determine a parameter of the object from the range of the object and the Doppler frequency and navigate the vehicle with respect to the object based on the parameter. The processor is further configured to determine the Doppler frequency from the combined frequency space by determining a frequency having a maximal intensity.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
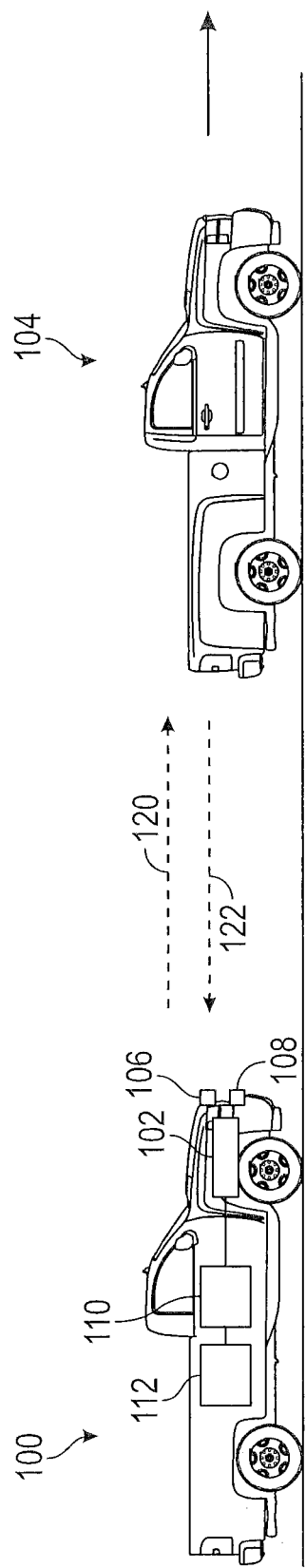
FIG. 1 shows a vehicle that includes a radar system suitable for determining relative velocity of a target or object with respect to the vehicle.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention, FIG. 1 shows a vehicle 100, such as an automobile, that includes a radar system 102 suitable for determining relative velocity of a target or object 104 with respect to the vehicle 100. In the embodiment shown in FIG. 1, the radar system 102 includes a transmitter 106 and a receiver 108. In alternate embodiments, the radar system 102 may be a MIMO (multi-input, multi-output) radar system that includes an array of transmitters and an array of receivers. The radar system 102 controls and operates the transmitter 106 to generate a radio frequency wave (a "source signal" 120). In one embodiment, the source signal 120 includes a linear frequency-modulated continuous wave (LFM-CW), often referred to as a chirp signal. Alternatively, the source signal 120 can be a pulsed signal or a combination of pulsed and chirp signals. A reflection of the source signal 120 from the object 104 is referred to herein as a reflection signal 122. The reflection signal 122 is received at the receiver 108, and the radar system 102 samples the reflection signal 122. The sampled reflection signal is provided to a control unit 110.

The control unit 110 includes a processor for performing a transform such as a Fast Fourier Transform (FFT) on the sampled signal to obtain a frequency space in order to determine a range frequency of the reflection signal 122 and the Doppler frequency. The range frequency is used to determine a range or distance to an object 104 and the Doppler frequency is used to estimate the relative velocity of the object 104 with respect to the vehicle 100. Knowledge of the range and relative velocity of the object 104 with respect to the vehicle 100 can then be used to maneuver the vehicle 100 by, for example, accelerating or decelerating the vehicle 100 or steering the vehicle to avoid the object 104. In one embodiment, the control unit 110 cooperates with an autonomous driving system 112 to control steering and acceleration/deceleration components to perform necessary maneuvers at the vehicle 100 to avoid the object 104 using the range and relative velocity measurements. In another embodiment, the control unit 110 provides a signal to alert a driver of the vehicle 100 so that the driver can take necessary actions to avoid the object 104.

While the radar system 102 is discussed herein as being on-board a vehicle 100, the radar system 102 may also be part of an immobile or stationary object in alternate embodiments. Similarly, the object 104 can be a vehicle or moving object or it can be an immobile or stationary object.

Figure 2:
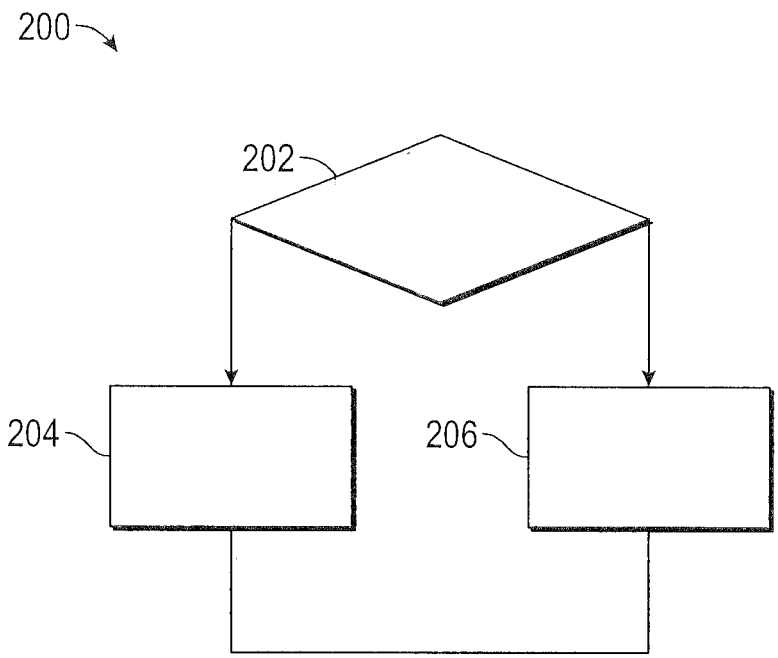
FIG. 2 shows a flowchart for selecting a processing operation for the radar system.

The control unit 110 determines range and Doppler frequencies using different methods depending on an external selection or input. FIG. 2 shows a flowchart 200 for selecting a processing operation for the radar system 102. In decision box 202, a decision is made on the processing method. In a first selected processing method (box 204) the radar system 102 is operated according to a regular or standard method for obtaining range and Doppler measurements, in which the maximum velocity (i.e., the maximum Doppler frequency) that can be measured by the radar system 102 is related to various operating parameters of the radar system 102, such as a sampling frequency or pulse repetition interval of the radar system 102, which are discussed herein with respect to FIG. 3. Velocities that exceed the maximum velocity are recorded as aliased frequencies within the frequency space obtained from the signal. Such as aliased frequencies can lead to false velocity determination.

In a second selected processing method (box 206) the radar system 102 determines range and Doppler measurements by performing the methods disclosed herein for extending a Doppler range of the radar system 102. In other words effective maximal velocity that can be obtained by the radar system 102 is increased beyond the stated maximum velocity of the radar system in regular operation of the radar system. Increasing the effective maximal velocity beyond the stated maximal velocity reduces the effects of aliasing in the resulting frequency space. The velocity of the vehicle 100 can be checked on a periodic basis in order to change the processing operation to accommodate the changing velocities of the vehicle 100.

Figure 3:
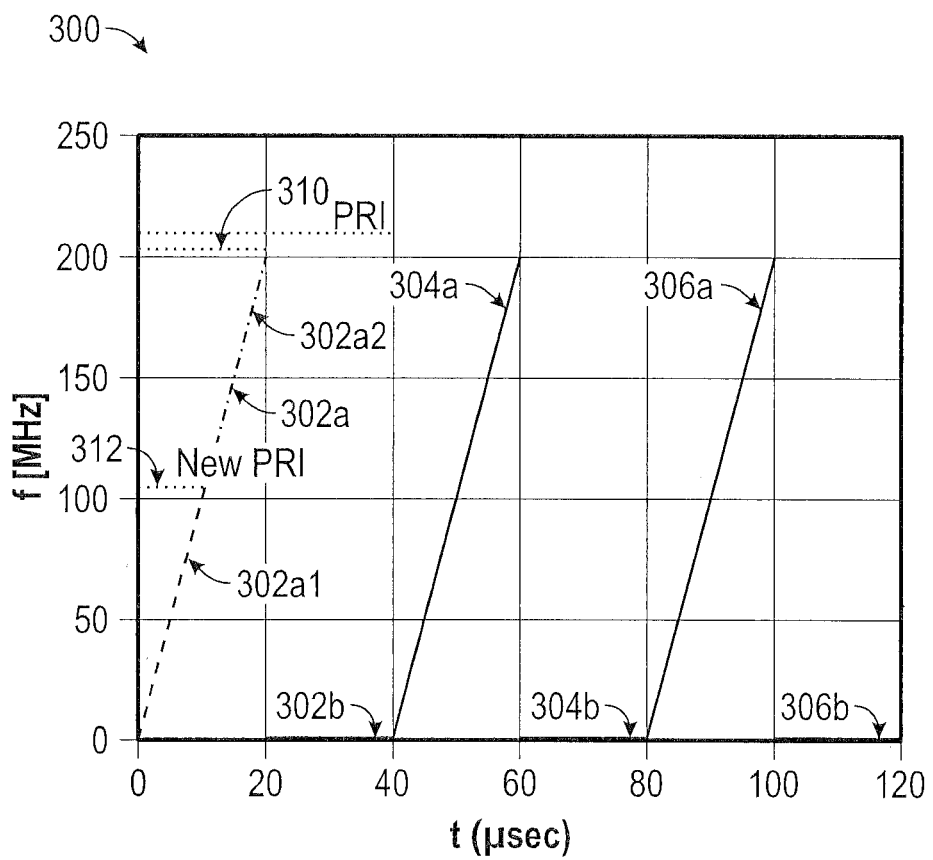
FIG. 3 shows a sampling sequence suitable for use by the radar system of FIG. 1 as well as an effective PRI achieved using the methods disclosed herein.

FIG. 3 shows a sampling sequence 300 suitable for use by the radar system 102 of FIG. 1. The sampling sequence 300 transmits linear frequency modulated (LFM) signals 302a, 304a, 306a from a transmitter of the radar system 102. The leading edges of the LFM signals 302a, 304a, 306a are separated by a time interval known as a pulse repetition interval (PRI). The pulse repetition interval includes a transmission interval 304a during which the source signal (e.g., LFM signal 304a) is transmitted into the environment and a measurement interval 304b during which reflections of the source signal from environment is received back at the radar system 102 and measured. The radar system 102 obtains a plurality of samples during the measurement interval 304b, although for continuous wave radars, samples can also be obtained during the signal transmission interval. In various embodiments, the number of sample in the reflection signal is K, where $K=2^n$, although this is not meant as a limitation. The plurality of samples are provided to the processor of the control unit 110 which performs a transform, such as a Fast Fourier Transform (FFT), to obtain a frequency space from which range and Doppler frequency can be determined for the object.

In the high velocity scenario, the Doppler range of the radar system is increased using the methods described herein in order to record the high velocities of objects that accompany the high velocities scenario. In order to increase Doppler range of the radar system 102, the reflection signal is segmented into a plurality of streams, with the streams equal in time duration. In the illustrative embodiment of FIG. 3 the LFM signal 302a is segmented into a first LFM 302a1 and a second LFM 302a2. The duration of the first LFM 302a1 (length 312) is equal to the duration of the second LFM 302a2, both of which are equal to half of the duration (310) of the original LFM 302a. In partitioning the reflection signal, a first stream includes those samples that are due to the reflection of the first LFM 302a1 and a second stream includes those samples that are due to the reflection of the second LFM 302a2. The segmentation decreases an effective pulse repetition interval of the reflection signal, thereby increasing the effective maximum velocity that can be measured by the radar system. The new PRI is uniform with values of the new PRI peaking at times 0.25 and 0.75. The duration of the PRI determines the minimal determinable velocity. Therefore, the minimal value determined with the new PRI is 0.25 of the value determined with the original PRI. While FIG. 3 shows that the signal 302a is partitioned into two streams, this is not meant as a limitation. In various embodiments, the reflection signal can be segmented into M streams, where M>=2. The reflection signal includes K samples. Therefore, each of the M streams includes K/M samples.

Figure 4:
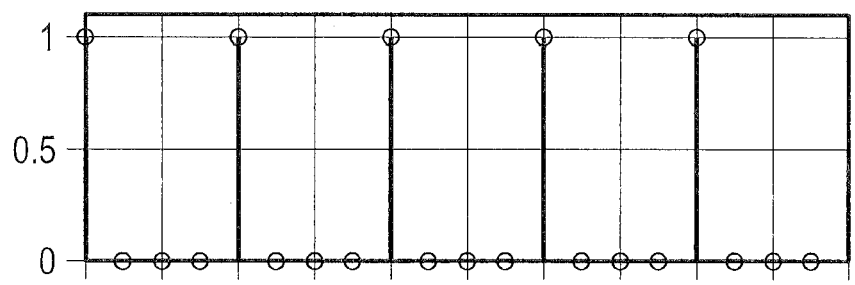
FIG. 4 shows a sampling interval for operating the radar system during a standard processing method and an illustrative sampling interval suitable for parameter detection using the methods disclosed herein.
Figure 4:
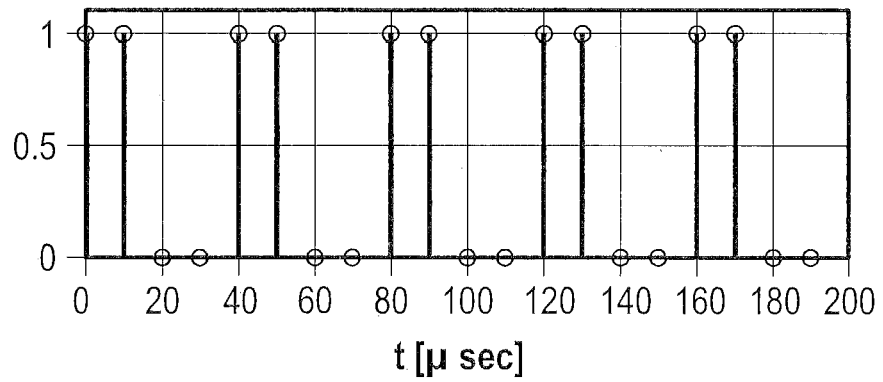

FIG. 4 shows a sampling interval for operating the radar system during a standard processing method and an illustrative sampling interval suitable for parameter detection using the methods disclosed herein. The graphs are related to the particular partition of the LFM signal 302a in FIG. 3. Graph 400 shows the sampling for the regular operation including a signal sampling during a single pulse repetition interval. The peaks of graph 400 at t=0 μsec, 40 μsec, 80 μsec, 120 μsec, . . . coincide with the beginning of each pulse repetition interval of FIG. 3. Graph 402 shows the sampling for extending the maximum Doppler frequency by doubling the number of sampling intervals and halving the duration of the sampling interval. The peaks of graph 402 at t=0 μsec, 10 μsec, 40 μsec, 50 μsec, 80 μsec, 90 μsec, 120 μsec, 130 μsec . . . represent a doubling up of the number of sampling intervals within a pulse repetition interval. The timing of the peaks is selected to divide or partition the chirp signal for the selected pulse repetition interval of FIG. 3.

Figure 5:
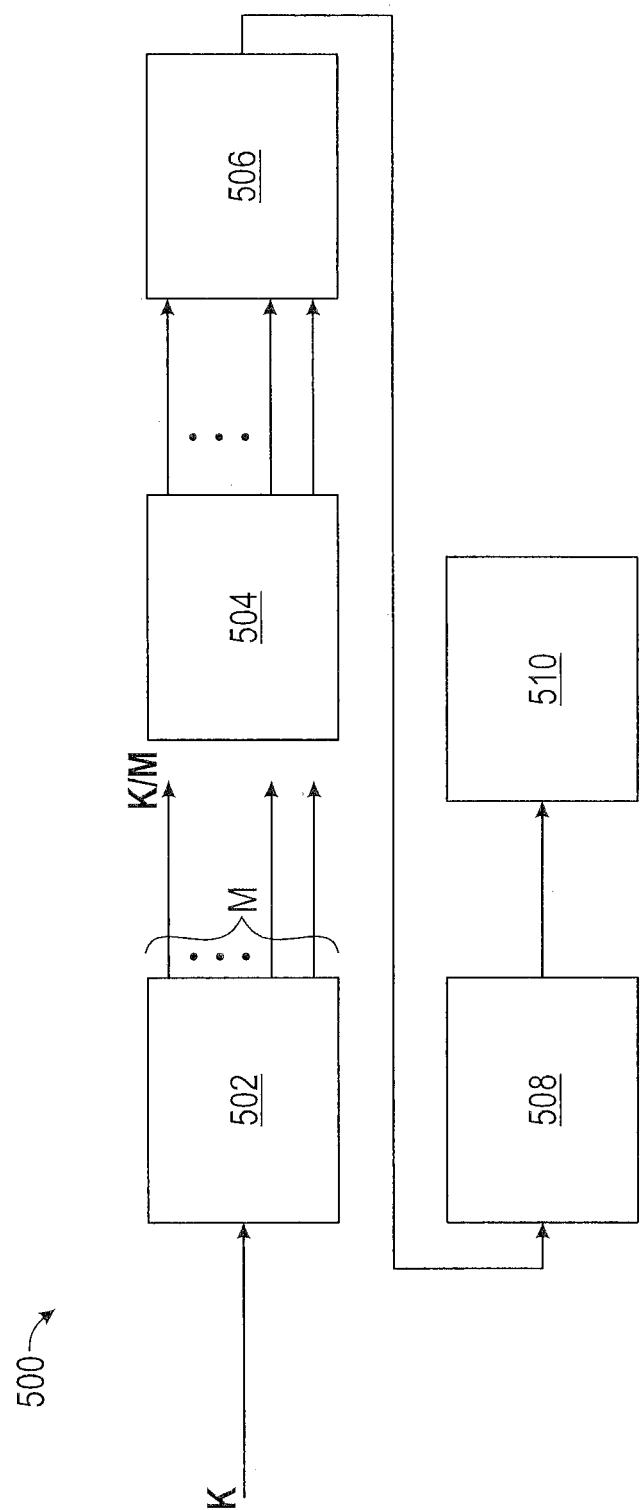
FIG. 5 shows a flow diagram for extending a Doppler range of a radar system according to an embodiment.

FIG. 5 shows a flow diagram 500 for extending a Doppler range of a radar system according to an embodiment. A selection of K samples is received at the processor. The receiver receives the reflection signal as an analog signal and an Analog-to-Digital converter (not shown) of the radar system 102 digitizes the signal, resulting in the K samples provided to the processor. In box 502, the processor divides, segments or partitions the K samples into M streams, whereas each stream includes K/M samples. In box 504, a transform is performed on each stream in order to obtain a frequency space for each stream. A dominant frequency in the frequency space indicates a range of the object. In one embodiment, a range for the object can be determined at all of the frequency spaces. Once the range has been determined, then in box 506, the frequency spaces for the separate streams are combined into a single frequency space. The frequencies for the separate streams are interleaved together when the frequency spaces are combined. For example, a first frequency space can include frequencies $f1_A$, $f2_A$, . . . $fN_A$ while the second frequency space includes frequencies $f1_B$, $f2_B$, . . . $fN_B$. Similar sequential interleaving is performed for a higher number of frequency spaces. The frequencies of the combined frequency space are then interleaved as follows: $f1_A$, $f1_B$, $f2_A$, $f2_B$, . . . $fN_A$, $fN_B$. The frequencies are corrected for a phase difference between streams. In box 508, the combined frequency space is used to determine a Doppler frequency of velocity of the object. By separating the signal into M samples in order to determine range and combining the frequencies spaces in order to determine the Doppler frequency, the maximum velocity of the radar system is increased by a factor of M over normal operation of the radar system. In box 510, the range and Doppler parameters are used by the processor in order to detect the object. The detection of the object can be used at process 112 (FIG. 1) to navigate the vehicle with respect to the object in the environment, for example, in order to avoid contact with the object.

Figure 6:
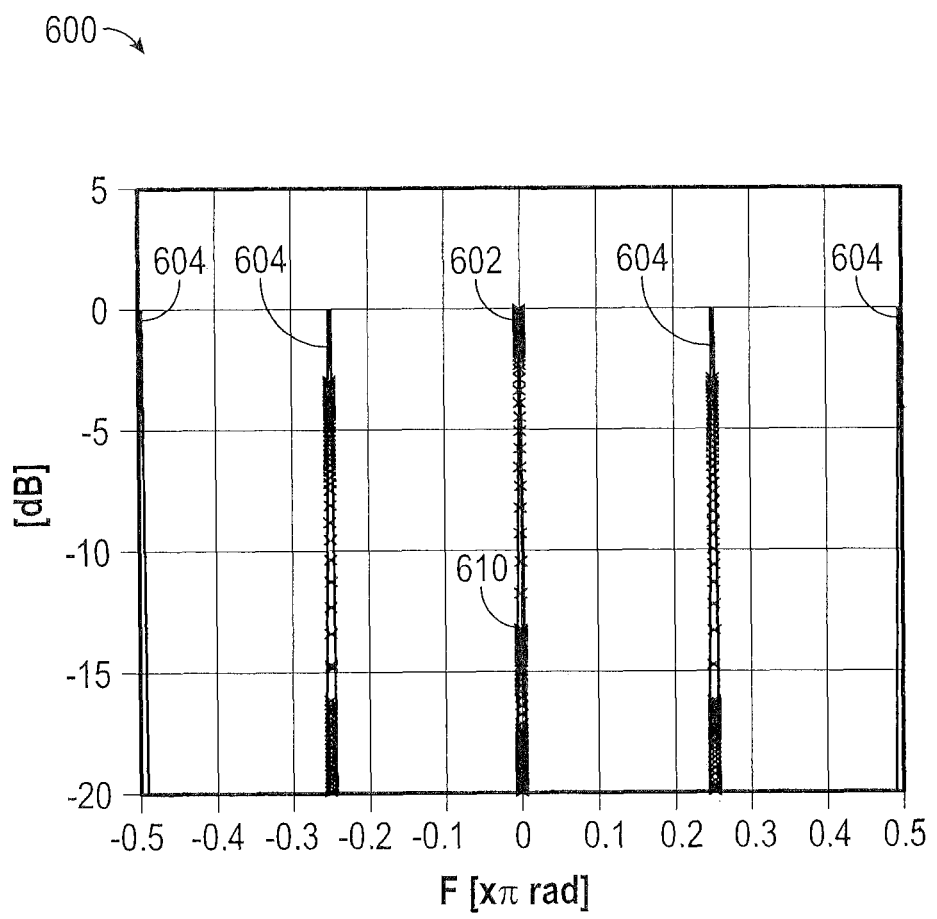
FIG. 6 shows a comparison of Doppler frequencies obtained using a regular operation of the radar system and using the methods disclosed herein for extending the Doppler frequency.

FIG. 6 shows a frequency space 600 providing a comparison of Doppler frequencies obtained using a regular operation of the radar system and Doppler frequencies obtained using the methods disclosed herein for extending the Doppler frequency. A true Doppler frequency 602 is shown with a plurality of aliased frequencies 604, which mask the true Doppler frequency 602. Also shown are the frequency signals 610 obtained using the methods disclosed herein for includes the true Doppler frequency. Using the frequency signals 610, it is possible to select the true Doppler frequency 602 from the aliased frequencies 604 by locating the frequency having the greatest, maximal or highest intensity or amplitude.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system for navigating a vehicle, comprising:
a radar system that transmits a linear frequency modulated signal into an environment of the vehicle and receives a reflection of the linear frequency modulated signal from an object in the environment; and
a processor configured to:
partition the reflection into a plurality of streams of equal time duration;
obtain a frequency space for each of the plurality of streams;
determine a range of the object from at least one of the frequency spaces;
combine the frequency spaces into a combined frequency space; and
determine the Doppler frequency from the combined frequency space that exceeds a maximum Doppler frequency of the radar system.

2. The system of claim 1, wherein the processor is further configured to partition the reflection into the plurality of streams in response to an external input.

3. The system of claim 1, wherein the maximum Doppler frequency is defined by a pulse repetition frequency of the radar.

4. The system of claim 1, wherein the processor is further configured to correct a phase difference between the plurality of streams when combining the frequency spaces.

5. The system of claim 1, wherein the processor is further configured to determine a parameter of the object from the range of the object and the Doppler frequency and navigate the vehicle with respect to the object based on the parameter.

6. The system of claim 1, wherein the processor is further configured to determine the Doppler frequency from the combined frequency space by determining a frequency having a maximal intensity.

7. A vehicle, comprising:
a radar system that transmits a linear frequency modulated signal into an environment of the vehicle and receives a reflection of the linear frequency modulated signal from an object in the environment; and
a processor configured to:
partition the reflection into a plurality of streams of equal time duration
obtain a frequency space for each of the plurality of streams;

determine a range of the object from at least one of the frequency spaces;

combine the frequency spaces into a combined frequency space; and determine the Doppler frequency from the combined frequency space that exceeds a maximum Doppler frequency of the radar system.

8. The vehicle of claim 7, wherein the processor is further configured to partition the reflection into the plurality of streams in response to an external input.

9. The vehicle of claim 7, wherein the processor is further configured to correct a phase difference between the plurality of streams when combining the frequency spaces.

10. The vehicle of claim 7, wherein the processor is further configured to determine a parameter of the object from the range of the object and the Doppler frequency and navigate the vehicle with respect to the object based on the parameter.

11. The vehicle of claim 7, wherein the processor is further configured to determine the Doppler frequency from the combined frequency space by determining a frequency having a maximal intensity.

\* \* \* \* \*